Dec. 9, 1941.  M. H. SMITH  2,265,550
STRAINER
Filed July 3, 1940  2 Sheets-Sheet 1

INVENTOR
MYRON H. SMITH
BY Martin & Rendell
ATTORNEYS

Dec. 9, 1941.   M. H. SMITH   2,265,550
STRAINER
Filed July 3, 1940   2 Sheets-Sheet 2
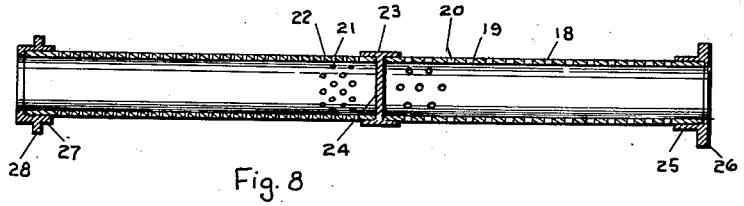
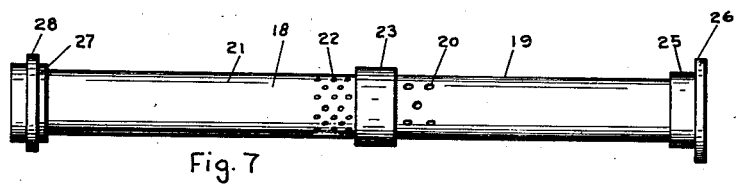
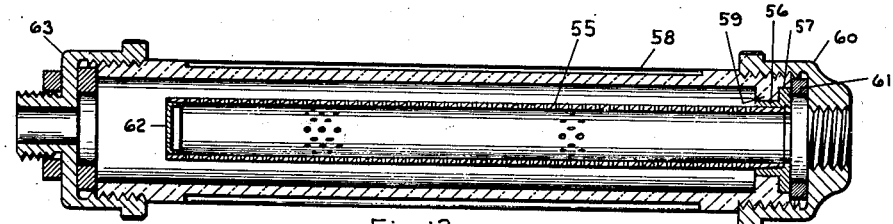
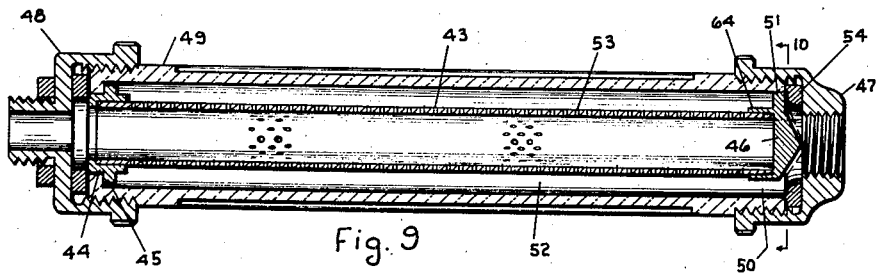
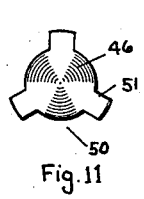
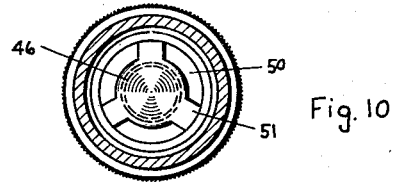
INVENTOR
MYRON H. SMITH
BY Martin & Rendell
ATTORNEYS Patented Dec. 9, 1941

2,265,550

UNITED STATES PATENT OFFICE 2,265,550

STRAINER

Myron H. Smith, New Hartford, N. Y., assignor to D. B. Smith & Company Inc., Utica, N. Y., a corporation of New York Application July 3, 1940, Serial No. 343,759

1 Claim. (Cl. 210—164)

My present invention relates to a strainer.

The purpose of this invention is to provide a strainer that is particularly adapted for use when spraying plants, vegetation, buildings or even animals with various spraying solutions, by means of a sprayer or spray pump or hose.

The special purpose of this invention is to provide such a sprayer which is of new and improved construction, and has great efficiency in operation and convenience in adjustment or in taking apart, as for removing the sediment or other foreign matter from the strainer.

A further purpose is to provide a strainer of the type indicated which has a transparent shell so that the user can readily notice the action of the strainer and see whether the strainer members are becoming clogged with an accumulation of sediment or foreign matter too large to go through the perforations of the straining member itself.

Further purposes and advantages of the invention will appear from the specification and claim hereinafter set forth.

Fig. 7 is a side elevation of the strainer member used in the strainer shown in Figs. 1 and 2.

Fig. 8 is a central longitudinal sectional view of the strainer member shown in Fig. 7.

Fig. 9 is a central longitudinal sectional view similar to Fig. 2 but of a modified form of strainer.

Fig. 10 is a transverse sectional view on line 10—10 of Fig. 9.

Fig. 11 is an end elevation of the end closure and spider-shaped spacing member used at the inlet end of the strainer shown in Fig. 9.

Fig. 12 is a central longitudinal sectional view of another modified form of strainer embodying this invention.

Figure 1:
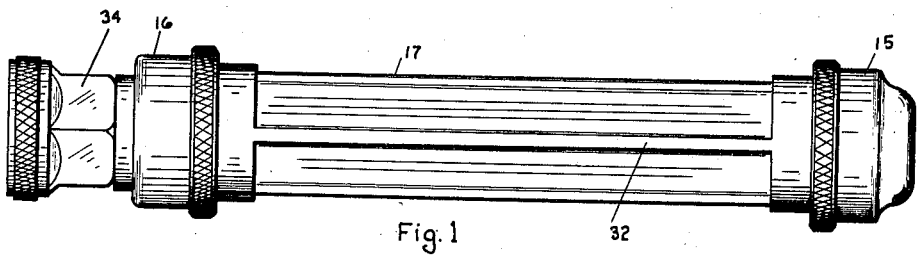
Fig. 1 is a side view of a strainer embodying one form of the invention and having a nozzle connected to its outlet or left hand end.

Referring to the drawings in a more particular description and first to the form of strainer shown in Figs. 1 to 8, it will be seen that the strainer comprises a centrally perforated circular cap 15 for the inlet end of the strainer and a very similar centrally perforated circular cap 16 for the outlet end of the strainer, said caps being at the respective right hand and left hand ends of the strainer shown in Figs. 1 to 9, and 12; and a cylindrical and preferably transparent shell 17 interposed between said two caps, and a strainer member 18 mounted within said transparent shell and reaching from the inlet cap to the outlet cap.

Figure 2:
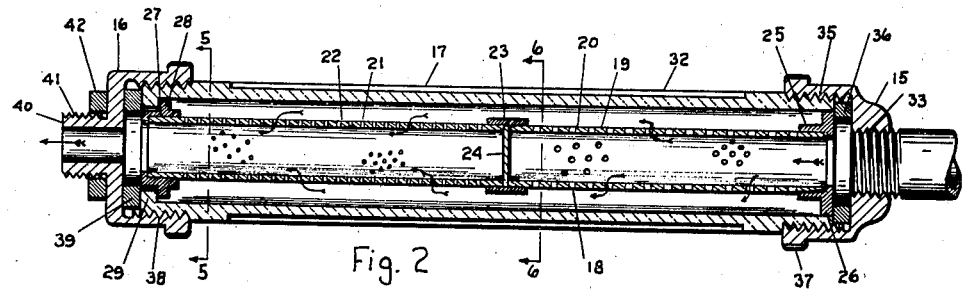
Fig. 2 is a central longitudinal sectional view of the strainer shown in Fig. 1 but with the nozzle removed.
Figure 4:
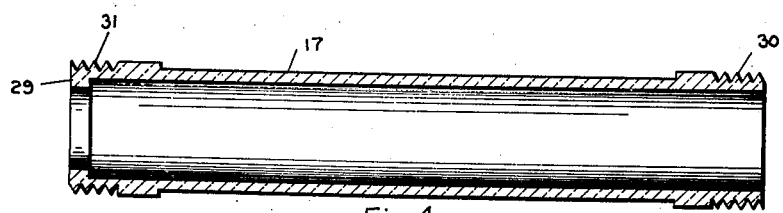
Fig. 4 is a central longitudinal sectional view through the shell shown in Fig. 3.
Figure 3:
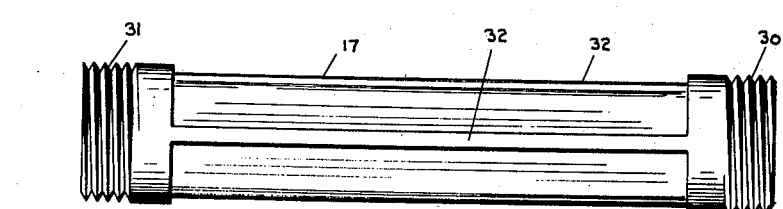
Fig. 3 is a side elevation of the shell used in said strainer, said shell preferably being transparent.
Figure 5:
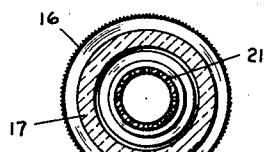
Fig. 5 is a transverse sectional view on line 5—5 of Fig. 2.
Figure 6:
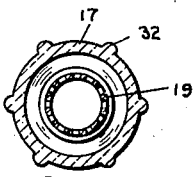
Fig. 6 is a similar transverse sectional view on line 6—6 of Fig. 2.

In the form of the invention shown in Figs. 1 and 2 the strainer member 18 is a double strainer member having its right hand or inlet half 19 provided with relatively coarse perforations 20, while the other or left hand and outlet half 21 is provided preferably with finer perforations 22. These screen sections 19 and 21 are conveniently formed of pieces of sheet brass provided respectively with the coarse perforations 20 and the fine perforations 22, with the pieces of sheet brass rolled to a cylindrical form and with their longitudinal edges suitably fastened together. Adjacent ends of these two screen sections are permanently fastened together by being inserted into and soldered to the inside of a ring 23.

Within the ring is placed an imperforate disk 24 preferably permanently fastened in place and forming a partition or baffle between the two halves of the screen member. At the outer or inlet end of the strainer member 19 there is attached an exterior encircling annular ring 25 which has at its outer end an annular flange 26, the outer diameter of which is of a size to closely fit the interior diameter of the shell 17. The outlet or left hand end of the screen or strainer member 18 is provided with a short cylindrical collar 27 fastened to the outside of the left hand end of the outlet half 21 of the strainer or screen member 18. A little back from its outer end said collar is provided with an outwardly extending rib 28, which rib has its outer endwise face engage the flange 29 provided at the side of the outlet end of the shell 17, the engagement of said rib 28 being against the face of said flange 29, which faces toward the other end of the shell 17.

The peripheral face at the outer portion of the collar 27 fits against the axially directed or circular face of said rib 29. In this way the strainer member is located centrally of the shell 17 and liquid entering the strainer through the central aperture of the inlet cap 15 has to enter the chamber of the inlet half 19 of the strainer member. From thence the liquid must pass outwardly through the relatively large perforations 20, but leaves behind in the chamber of said inlet portion 19 any sediment or foreign matter too large to go out through the relatively large holes 20. The spraying liquid that has thus gone out from this first half of the strainer member passes lengthwise to the left as the parts are shown in the drawings, between the strainer member and the inner face of the shell 17 and then passes inwardly through some portion of the second half 21 of the strainer member. Sediment or foreign matter too large to go through the relatively finer holes 22 of this half of the member is left in the space between the said second half of the strainer and the shell 17. The user can readily determine the course of the straining operation and especially can see the accumulation of sediment or foreign matter within the chamber of the first half of the chamber member and especially between the second half of the chamber and the second half of the shell, since the shell as already mentioned is preferably fairly transparent, being composed of some form of plastic that combines the feature of transparency with sufficient strength and also resistance to liquid and the chemicals ordinarily used for spraying purposes.

The shell 17, as already mentioned, is cylindrical in general shape with the inturned flange 29 at its outlet end. The opposite ends of this shell 17 are of appreciable thickness for some distance in from their extreme ends in order to provide material for the formation therein of the external screw-threading 30 at the inlet end of the shell, and 31 at the outlet end of the shell. Between these thickened ends however the material of the shell is in the main of reduced thickness but is provided with a plurality, say six, outwardly extending longitudinally arranged ribs 32 which form stiffening or reinforcing members for the said shell and thus economise in the amount of plastic composition which is necessary for the formation of the shell.

The centrally apertured inlet cap 15 has its central aperture 33 interiorly screw-threaded to render this part of the strainer attachable to the outlet of a sprayer or spray pump or to a hose connection at the end of a hose, any of which arrangements are useful ways to apply this strainer to the spraying operation to the end that undissolved sediment or foreign material will be strained out before it gets to the small opening or openings of the nozzle 34, such as is shown for the purpose of illustration at the outlet end of the strainer in Fig. 1. It will be understood of course that the main purpose of my strainer is to prevent the clogging of the small openings of the nozzle 34, which clogging would temporarily stop the spraying and cause loss of time to remove the nozzle and clear its inside parts of the sediment or other foreign matter.

The interior side walls 35 of the inlet cap 15 are provided with screw threads which are adapted to fit the exterior screw threads provided upon this end of the shell 17. A rubber or similar somewhat elastic annular washer 36 is placed in the bottom of the main recess of the cap 35 so that its free side engages the outer endwise face of flange 26 on the strainer member and also engages the adjacent outer endwise face at the end of the shell and thus forms a liquid-tight joint at this end of the structure, to the end that all of the liquid passing inwardly through the inlet cap 15 must pass into the chamber of the first half of the strainer member. It will be noted that the left hand extremity of the inlet cap 15 is provided with an outwardly extending enlargement or rib 37 which has its periphery knurled or otherwise roughened whereby this cap can be removed by hand by the operator without the use of a tool. It will be understood that this inlet end of the strainer is the part that is first disassembled when it is desired to remove the strainer member for cleaning that part or for cleaning out the sediment or other foreign matter from the further end of the shell. The other or outlet cap 16 is in the main constructed similar to the inlet cap 15 in that said outlet cap has its lengthwise extending walls provided with interior screw threads 38 to fit the interior screw threads on the left hand or outlet end of the shell 17. In the bottom of the cup or cavity of this cap is provided a washer of suitable material adapted to take against the end faces of the shell and of the collar 27 at this end of the strainer member, so as to make a water-tight or liquid-tight connection with the cap and these parts.

Preferably instead of simply an aperture on this outlet cap 16 there will be a short outwardly extending length of pipe or tubing 40, preferably formed integral with the cap and provided with exterior screw threads 41, whereby this end of the strainer can be attached to the conventional nozzle 34, or otherwise to the interior screw-threaded portion of the female end of any conventional hose coupling or spraying unit part. Preferably onto this threaded tubular portion 40 will be placed an annular washer 42 as of fibre or the like, to insure a non-leaking connection between the said cap and the nozzle 34 or other attached fitting.

The main variation of my invention shown in Figs. 9, 10 and 11 consists in using a strainer member 43, which is as long as the double strainer illustrated especially in Figs. 7 and 8, and used with the first form of my invention. This strainer member 43 is a single strainer in the sense that its whole length is provided with perforations of one size or grade. Its outlet end is provided with a securely fastened collar 44 having an outwardly extending intermediately arranged ridge 45 mechanically the same as the parts 27 and 28 already described with reference to Figs. 7 and 8 of the first form of my invention, and in fact the inlet cap 47 and the outlet cap 48 and the shell 49 of this form of the device are exactly the same respectively as the inlet cap 15, outlet cap 16 and shell 17 first herein described.

The other variation in this modification of my invention is that there is applied to the right hand end of the strainer member 43 a combined stop member and spider locating member 46 of which a plan view is shown in Fig. 11. This member 46 as plainly seen in the transverse sectional view thereof in Fig. 10, entirely covers the right hand end of this strainer and blocks the entrance into this end of the strainer member of the liquid entering the strainer as a whole through the inlet cap 47. Preferably the side of the stop member 46 that is directed toward the central aperture of the inlet cap 47 is made conical in exterior formation as shown in Fig. 9 and suggested in Fig. 11, so as to more directly and easily divert the liquid radially to pass through the openings 50 left between the radially arranged outwardly extending arms 51 of this spider-like locating member 46 (see Fig. 11). The arms 51 reach out to fit against the inner surface of the shell 49 and a short cylindrical flange 64 on the left hand face of the member 46 encircles the adjacent end of the strainer 43 and these hold the body of the stop member 46 in place over this end of the strainer member 43. The openings 50 between the arms 51 allow ample space for the passage to the left of the liquid on its way towards the annular chamber 52, being the space between the inside face of the shell 49 and the outwardly extending and numerously perforated face 53 of the strainer member 43. As the left hand end of this chamber 52 is obviously blocked, the spraying liquid has to pass inwardly anywhere through the whole length of the long strainer member 43. From the inside of this strainer member the liquid will pass lengthwise and to the left as shown in Fig. 9, through the outlet end of the strainer member 43 and out through the central outlet aperture provided in the outlet cap 48. In this form of the strainer all of the sediment or foreign matter will be left on the outside of the strainer member where it may easily be seen by the user. For many purposes this form of strainer is very effective when the strainer member is provided with holes of the proper size to strain out the undesirable parts carried by the liquid. It will be seen that this modification of the strainer provides twice as much capacity for holding unwanted material outside of the strainer member, as compared with half of the strainer member having its grade of openings as shown in the first form of my device. In this form of the invention a suitable annular washer 54 is interposed between the bottom of the cavity of the inlet cap and the adjacent end edge of the shell 49 and the outer extremities of the three spacing arms 51. This washer therefore obviously holds said member 46 securely in place. In this form of the invention also the device is disassembled by unscrewing the inlet cap 47 from the shell 49, whereupon the strainer member 43 as a whole may be readily removed from the shell and the strainer member and the inside of the shell cleansed of any accumulated sediment and foreign material.

The third form of this invention is plainly illustrated in the central longitudinal sectional view Fig. 12. In this construction the strainer member 55 is of the single gauge or perforation type and extends for substantially the full length of the strainer, and so has large capacity for straining what material can be taken out with a single gauge strainer. This strainer member 55 however is hung from and attached to the inlet or right hand end of the strainer, as by means of the perforated portion of the strainer member 55 being provided at its right hand end with an encircling annular collar 56 from the outer end of which extends a radially arranged flange 57. The shell 58 of this variation is provided slightly spaced in from its right hand end, with an inwardly extending strong rib 59, against the outer or right hand face of which bears the left hand face of the flange 57 of the strainer member 55. The inlet cap 60 of this construction is the same in mechanical structure as the inlet cap 15 of the first form of the invention and is provided with an interiorly arranged washer 61, which now will bear against not only the right hand end edge of the shell 58 but also against the right hand face of the flange 57. In this way the flange of the right hand end of the strainer member 55 is securely held against the shell 58 and thus said strainer member 55 is held in the position of being spaced throughout its whole length from the inside end of the shell 588. It will be understood of course that the left hand end of the strainer member 55 is provided with some form of an imperforate end 62, so that all the liquid entering the strainer member 55 has to go out through the apertures of the strainer member 55 from whence the liquid has to pass endwise to the left and out the central opening provided in the outlet cap 63.

Two or more of any four of my strainers may be used in tandem manner on a hoseline before the nozzle or beyond a spray pump and this arrangement is especially efficient when two strainers of either of my modified forms are used, in which case preferably the strainer first reached by the liquid will have coarser apertures than the second reached strainer.

What I claim as new and desire to patent is:

A strainer for attachment to a sprayer or a spraying hose comprising a centrally apertured inlet cap, a centrally apertured outlet cap, a long cylindrical imperforate transparent shell having its opposite ends screw-threadedly connected to and communicating with said caps, a rigid, self-sustaining cylindrical perforated strainer member enclosed within the shell and reaching from cap to cap, with its opposite lengthwise halves provided with successively smaller screening apertures, outwardly extending flanges at the ends of the strainer member reaching to the adjacent inside of the shell and holding the strainer member spaced from the shell, and an imperforate baffle arranged intermediate the two halves of said strainer member so that the liquid enters the first part of the strainer and passes outwardly therefrom and then moves lengthwise within the shell and then inwardly through the second part of the strainer, and thence out endwise therefrom and through the outlet cap, annular resilient packings interposed between the inner face of each cap and the opposing ends of the shell and of the strainer member and means for detachably connecting the outer ends of said caps to a hose or a sprayer.

MYRON H. SMITH.